United States Patent [19]

McGarity et al.

[11] Patent Number: 5,086,407
[45] Date of Patent: Feb. 4, 1992

[54] DATA PROCESSOR INTEGRATED CIRCUIT WITH SELECTABLE MULTIPLEXED/NON-MULTIPLEXED ADDRESS AND DATA MODES OF OPERATION

[76] Inventors: Ralph C. McGarity, 3813 Kandy Dr., Austin, Tex. 78749; William B. Ledbetter, Jr., 11802 Knollpark Dr., Austin, Tex. 78758; Steven C. McMahan, 8405 Manuai Dr., Austin, Tex. 78749; Michael G. Gallup, 1102 Radan Cir., Austin, Tex. 78745; Russell Stanphill, 8405 Bent Tree #2823, Austin, Tex. 78759; James G. Gay, 301 Oat Meadow Dr., Pflugerville, Tex. 78660

[21] Appl. No.: 361,539

[22] Filed: Jun. 5, 1989

[51] Int. Cl.⁵ .............................. G06F 13/38
[52] U.S. Cl. .................... 395/800; 364/942; 364/935.4; 364/927.8; 364/948.1; 364/935.42; 364/232.8; 364/232.9; 364/238; 364/240.5; 364/DIG. 1; 364/DIG. 2
[58] Field of Search ... 364/200 MS File, 900 MS File; 307/465

[56] References Cited

U.S. PATENT DOCUMENTS

| | | | |
|---|---|---|---|
| 4,453,211 | 6/1984 | Askinazi et al. | 364/200 |
| 4,649,471 | 3/1987 | Briggs et al. | 364/200 |
| 4,698,750 | 10/1987 | Wilkie et al. | 364/200 |
| 4,755,965 | 7/1988 | Mary et al. | 364/900 |
| 4,839,795 | 6/1989 | Iwaksaki | 364/200 |
| 4,902,917 | 2/1990 | Simpson | 307/465 |
| 4,907,225 | 3/1990 | Gulick et al. | 370/94.1 |
| 4,969,121 | 11/1990 | Chan et al. | 364/900 |
| 4,975,832 | 12/1990 | Saito et al. | 364/200 |

*Primary Examiner*—Thomas C. Lee
*Assistant Examiner*—Mehmet Geckil
*Attorney, Agent, or Firm*—Robert L. King

[57] ABSTRACT

A single chip data processor integrated circuit having an input which can be programmed to place the circuit's address and data bus terminals into one of two modes. In a first or multiplexed mode, the circuit's address and data terminals are directly connected and address bits are time division multiplexed with data bits when both are written to external circuitry. In a second or normal mode, the circuit's address and data terminals are not connected and address bits are communicated with the circuit independent of data bits which are communicated with the circuit. No circuitry external to the integrated circuit is required to implement the multiplexed mode. A control portion insures that bit collisions are avoided when the circuit is in the multiplexed mode.

9 Claims, 4 Drawing Sheets

DATA PROCESSOR INTEGRATED CIRCUIT WITH SELECTABLE MULTIPLEXED/NON-MULTIPLEXED ADDRESS AND DATA MODES OF OPERATION

TECHNICAL FIELD

This invention relates to data and address buses of data processors, and more particularly, to time division multiplexing of address and data buses in a data processor.

BACKGROUND OF THE INVENTION

There are generally two classes of previous data processors with respect to the subject of structural configuration of address and data buses of a data processing system. A first class of data processing system bus structures includes data processing systems which have separate and distinct address and data buses and which always communicate bits independent of each other. A second class of data processing system includes data processors having address and data bits multiplexed and communicated via the same communication bus. Of the second class of data processing systems, two sub-classes of data processors typically exist. A first sub-class of data processors includes data processors which have separate and distinct paths and architectures for data and address bits. Multiplexing of address and data bits in a data processing system for this sub-class of data processors is implemented by a multiplexor and control circuitry external to the data processor integrated circuit chip. Therefore, a circuit board size penalty exists for this sub-class of data processors in order to obtain a multiplexed data and address bus. Also, inherent delay, particularly set-up time for the multiplexing circuitry external to the integrated circuit data processor, generally slows system operating speeds and performance. A second sub-class of data processors includes data processors which internally multiplex data and address buses onto a single external communication bus. A disadvantage with this sub-class of data processors is that the data processor always has a multiplexed bus operation and a specific bus protocol giving a user no system flexibility to modify this system feature. Because previous data processors have not allowed a user equally satisfactory system performance with respect to the choice of multiplexing of address and data bus structures, designers have previously had to use a specific type of data processor in response to the bus structure chosen or have otherwise suffered a performance penalty resulting from circuit delay associated with multiplexing circuitry contained on a single integrated circuit chip.

SUMMARY OF THE INVENTION

Accordingly, it is an object of the present invention to provide an improved data processor with externally controlled multiplexed and non-multiplexed address and data output buses.

Another object of the present invention is to provide an improved method for providing a data processor having address and data output buses which can be easily selectively time division multiplexed.

It is yet another object of the present invention to provide an improved data processor having an improved address and data output bus configuration feature.

In carrying out the above and other objects of the present invention, there is provided, in one form, a data processor, and method of use, having an address output bus and a data output bus which can be externally controlled for either time division multiplexed or non-multiplexed outputting of address and data bits. An input portion of multiplex bus mode circuitry of the data processor receives an input control signal which is coupled to the data processor from an external source. The input portion provides a bus mode signal in response to the input control signal having either a first or a second logic state. A control portion of the bus mode circuitry is coupled to the input portion and receives the bus mode signal. The control portion provides both a data drive signal and an address drive signal, the timing of which is controlled in part by the bus mode signal. An address bus drive portion is coupled to the control portion for providing address bits at a first output terminal of the data processor in response to the address drive signal. A data bus drive portion is coupled to the control portion for providing data bits at a second output terminal of the data processor in response to the data control signal. In response to the externally supplied input control signal and with the direct connection of the first and second output terminals, time division multiplexed operation of address and data bits at the connected first and second outputs is implemented without requiring additional circuitry external to the data processor. The data processor also provides no time division multiplexing of address and data bits respectively at the first and second outputs in response to the input control signal.

These and other objects, features, and advantages, will be more clearly understood from the following detailed description taken in conjunction with the accompanying drawings.

DETAILED DESCRIPTION OF THE INVENTION

Figure 1:
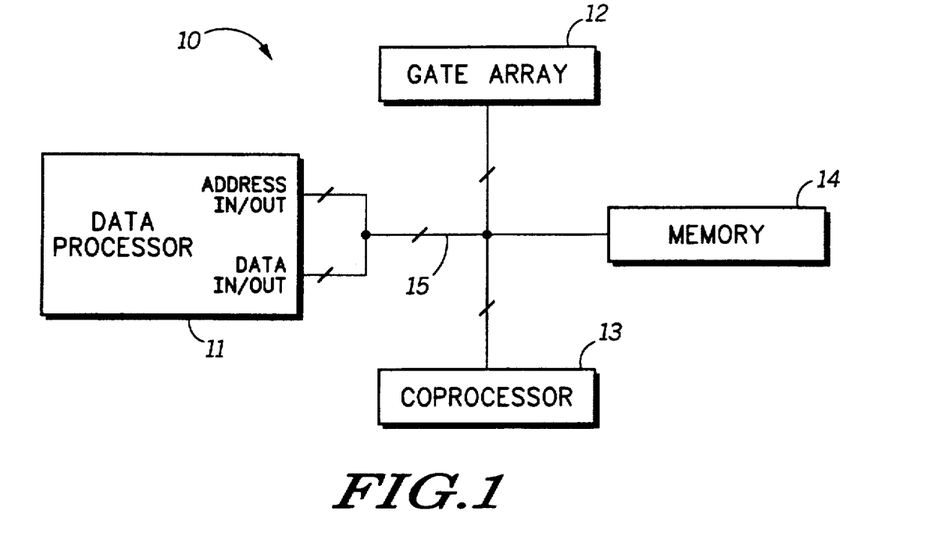
FIG. 1 illustrates in block diagram form an exemplary system configuration of a data processor using the present invention.

Shown in FIG. 1 is a data processing system 10 generally comprising a data processor 11, a gate array 12, a coprocessor 13 and a memory 14. Data processor 11 has an address input/output terminal and a data input/output terminal which are connected together via a multibit communication bus 15. Data processor 11 is connected to each of gate array 12, coprocessor 13 and memory 14 via communication bus 15. In accordance with the present inventio, data processor 11 is capable of operating with gate array 12, coprocessor 13 and memory 14 by time division multiplexing each of the address outputs with the data outputs so that bit collisions do not occur on communication bus 15. It should be noted that no additional circuitry external to data processor 11, such as a data multiplexor, is required to obtain the described circuit operation. In addition, the present invention functions to allow data processor 11 to also operate in a non-multiplexed mode of operation where the address output and data output of data processor 11 are not connected together and the outputs are provided separately and independently. The previously mentioned circuit operation occurs in response to a user provided control signal applied to an external input of data processor 11 as described below. Therefore, the present invention described herein provides a data processor which can be externally controlled and connected to provide either a multiplexed data and address output or a non-multiplexed data and address output. No multiplexing circuitry external to the data processor 11 is required.

Figure 2:
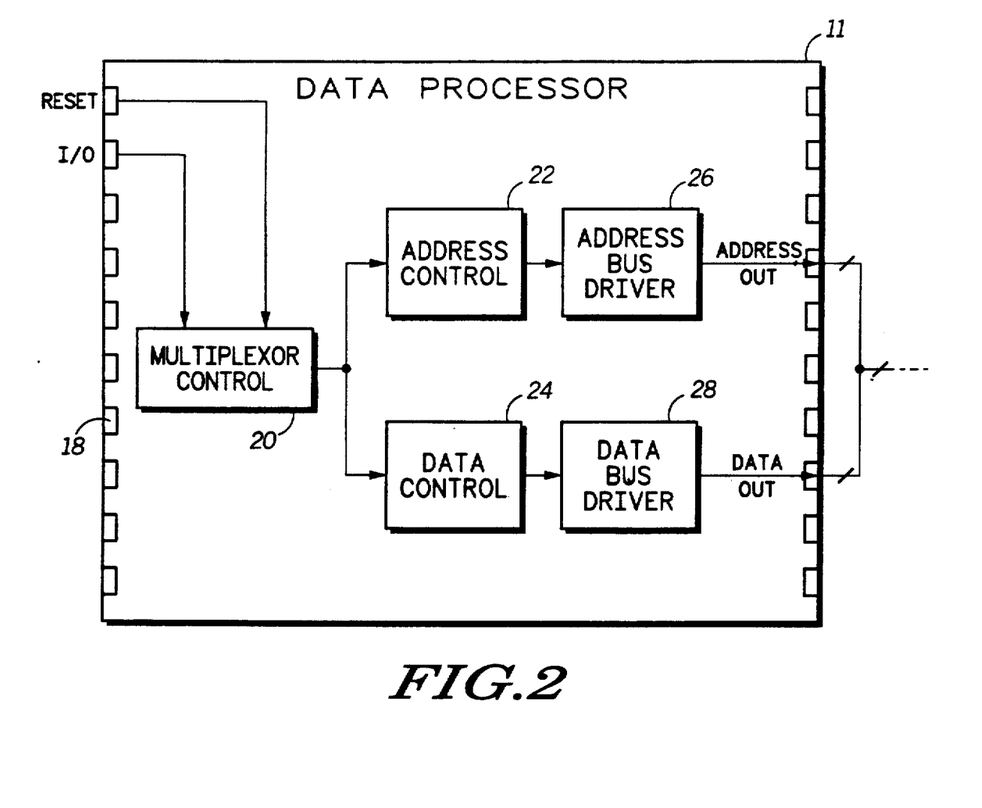
FIG. 2 illustrates in block diagram form the bus multiplexing system for use in a data processor in accordance with the present invention.

Shown in FIG. 2 is a detailed block diagram of the portion of data processor 10 of FIG. 1 which illustrates the operation of the present invention. Data processor 11 has a plurality of input or output terminals commonly called pins such as pin 18. A circuit input pin labeled "Reset" and a circuit pin for input/output signals labeled "I/O" are respectively connected to first and second inputs of a multiplexor control circuit 20. An output of multiplexor control circuit 20 provides a multiplexor mode signal labeled "Mux Mode" which is connected to both an address control circuit 22 and a data control circuit 24. Address control circuit 22 has an output connected to an address bus driver circuit 26, and data control circuit 24 has an output connected to a data bus driver circuit 28. An output of data bus driver circuit 28 is connected to a data output pin labeled "Data Out", and an output of address bus driver circuit 26 is connected to an address output pin labeled "Address Out". The data output pin and address output pin are connected together by a user only when multiplexed bus mode operation is desired as is shown in both FIGS. 1 and 2.

In operation, multiplexor control circuit 20 functions in response to externally supplied signals which are respectively applied to the Reset pin and I/O pins to provide a multiplexor mode signal. The multiplexor mode signal controls whether or not data processor 11 operates in a multiplexed address bus/data bus mode or a non-multiplexed address and data bus mode. Both modes are selected externally by a user by varying the logic value of the signals at the Reset and I/O pins. In one form, the multiplexed mode is selected in response to a predetermined logic value of a signal coupled to the I/O pin during assertion of a reset condition implemented by coupling a reset signal to the reset pin. Therefore, multiplexor control circuit 20 may be easily implemented with conventional circuitry. However, it should be readily understood that only one external control signal may be required to place data processor 11 in either a multiplexed or non-multiplexed address and data bus mode at the appropriate input/output pins of data processor 11. Further, other functions for the pin or pins which receive the external control signal may be implemented in addition to the bus mode feature. In response to the mux mode signal provided by control circuit 20, both address control circuit 22 and data control circuit 24 respectively provide address bits and data bits to address bus driver 26 and data bus driver 28, respectively. If placed in the non-multiplexed mode, address bus driver 26 and data bus driver 28 each independently output address and data bits, respectively, to the respective address and data output pins. In this mode, data processor 11 assumes that a user has externally configured system 10 so that the address output pin and data output pin are not connected together. When so configured, data processing system 10 functions with completely independent address and data buses, and no time division multiplexing of the address and data bus bits occurs. If placed in the multiplexed mode, address bus driver 26 and data bus driver 28 each output address and data bits, respectively, under selective control of the address control 22 and data control 24 circuits as described below. In this mode, data processor 11 assumes that a user has externally configured system 10 so that the address and data output pins are connected together for multiplexed communication bus operation. Address and data output bits are provided in a time division multiplexed operation.

Figure 3:
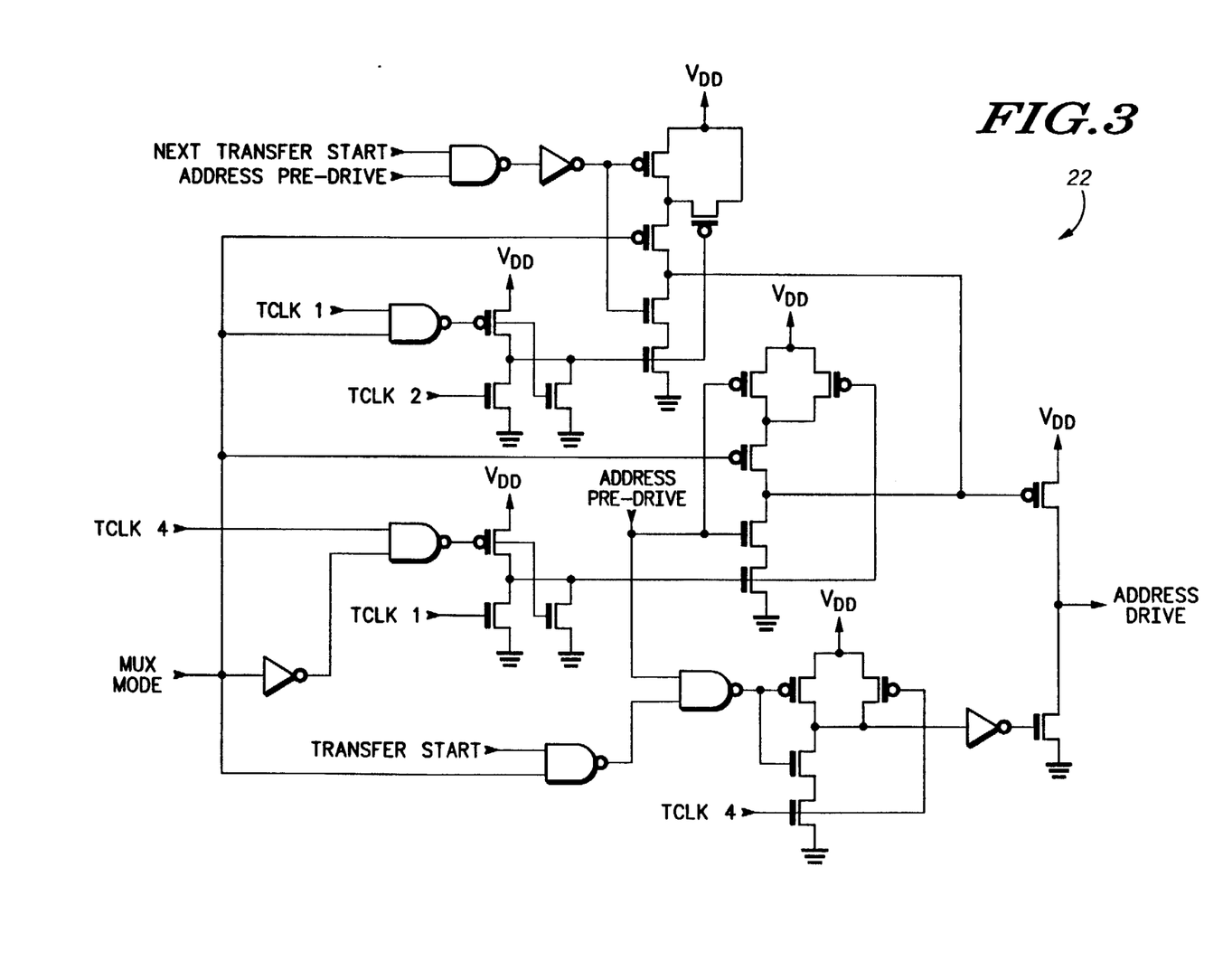
FIG. 3 illustrates in partial schematic form the address control circuit illustrated in FIG. 2.
Figure 4:
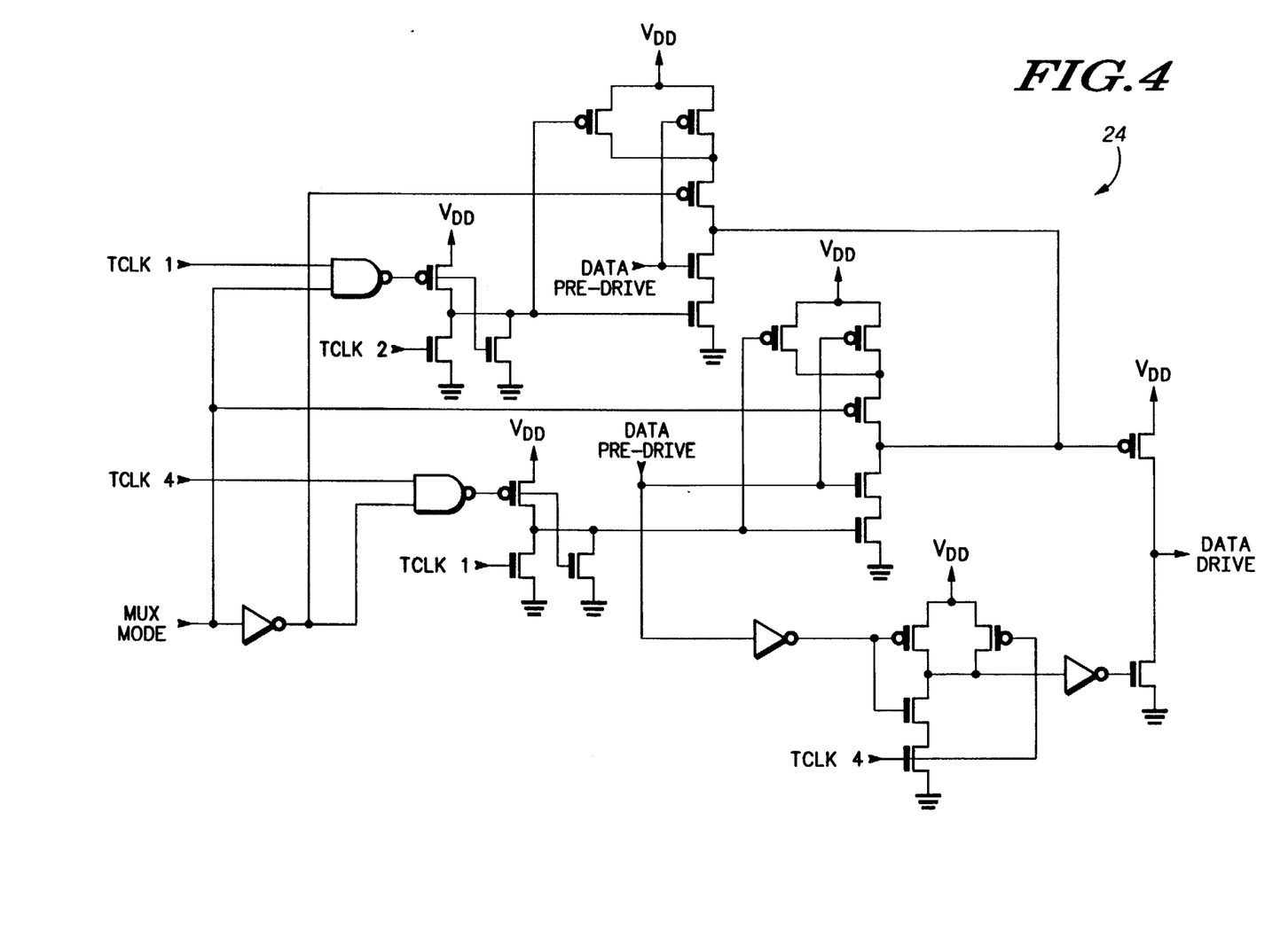
FIG. 4 illustrates in partial schematic form the data control circuit illustrated in FIG. 2.
Figure 5:
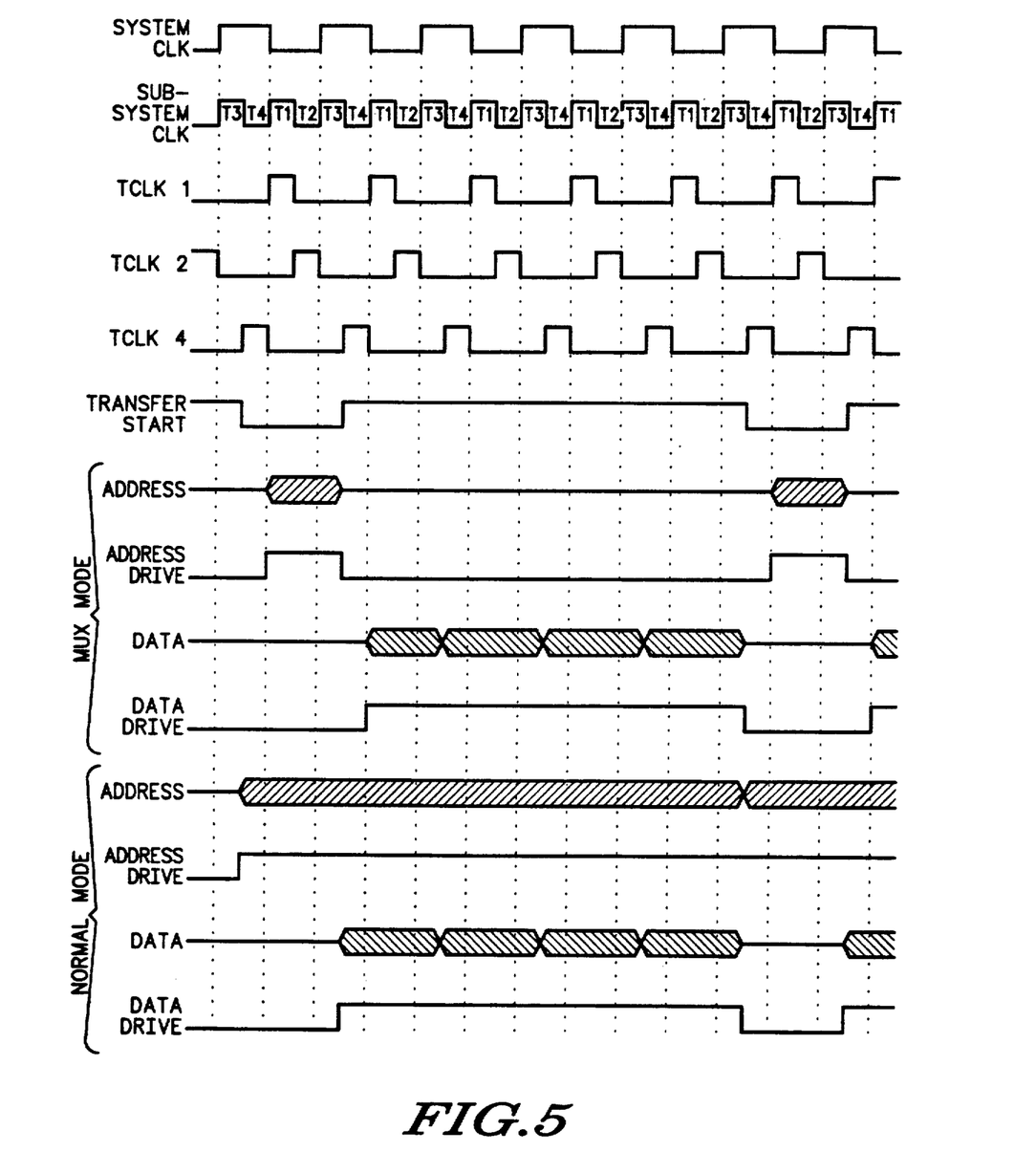
FIG. 5 illustrates in graphical form control and bus signals associated with FIGS. 2-4.

Shown in FIGS. 3 and 4 are partial schematic diagrams of address control circuit 22 and data control circuit 24, respectively. One of the functions of control circuits 22 and 24 is to provide a time separation between the address or data disablement and the enablement of the data or address, respectively. As illustrated, the multiplexor mode signal, labeled "Mux Mode", is connected to each of control circuits 22 and 24. In addition, address control circuit 22 utilizes several other input signals which are provided by other portions of data processor 11 not illustrated in FIG. 2. In particular, as shown graphically in FIG. 5, clock signals labeled "TClk 1", "TClk 2" and "TClk 4" are derived from a sub-system clock which is derived from a system clock of data processor 11. The sub-system clock has four clock sub-beats respectively labeled T1-T4. Clock signal TClk 1 corresponds to the T1 sub-beat portion of the sub-system clock, and an analogous correspondence exists for clock signals TClk 2 and TClk 4 and clock sub-beats T2 and T4, respectively. Data processor 11 provides address control circuit 22 with an 'Address Pre-Drive' signal which indicates that a new address is available to be outputted by data processor 11. Data processor 11 also provides address control circuit 22 with a "Transfer Start" signal which further qualifies the outputting of a new address during the multiplexed mode. The Transfer Start signal is the "Next Transfer Start" signal delayed by one clock sub-beat. As illustrated in FIG. 5, when the Transfer Start signal transitions from a logic high level to a logic low level, new address bits are outputted by data processor 10 regardless of whether data processor 10 is in a multiplexed or a non-multiplexed bus mode. In the preferred form, address control circuit 22 actually receives both a "Transfer Start" signal and a "Next Transfer Start" signal from other circuitry within data processor 11. The Transfer Start signal indicates an active or current transfer on the external communication bus 15. Similarly, a "Data Pre-Drive" signal is supplied by other circuitry within data processor 11 to indicate that data bits will be outputted during a subsequent or the next system clock cycle. The assertion of both the Data Pre-Drive signal and the Address Pre-Drive signal by data processor 11 only indicates that either data or address bits are available to be outputted by data processor 11 and does not function as a timing signal as the "Data Drive" and "Address Drive" signals are the actual timing signals affecting the outputting of data and address bits. In the illustrated form, data processor 11 initially provides an Address Pre-Drive signal indicating an outputting or writing of an address external to data processor 11. At the beginning of an immediately successive system clock cycle, data processor 11 provides a Data Pre-Drive signal indicating an outputting or writing of data external to data processor 11. In the normal or non-multiplexed mode of operation, whether or not the address bits are fully outputted before the beginning of the next system clock is irrelevant since the output buses are separate and distinct. However, in the multiplexed mode of operation, address control circuit 22 and data control circuit 24 must function to insure that collision of data and address bits on a single multiplexed communication bus does not occur.

In typical data processors, address bits corresponding to the location of information in external memory and data bits are simultaneously outputted at different output terminals. However, in some applications, the use of a single bus with multiplexed address and data bits are preferable. Shown in FIG. 5 are two groupings of address and data signals; one set illustrating the operation of data processor 11 in a multiplexed mode, and the other set illustrating the operation of data processor in a non-multiplexed or normal mode.

Assume initially that a multiplexed mode of operation exists so that the address output pin and data output pin of data processor 11 are physically connected together. A predetermined externally supplied control signal is connected to the I/O pin of data processor 11 during a reset mode to cause multiplexor control circuit 20 to provide a multiplexed mode signal to address control circuit 22 and data control circuit 24 indicating multiplexed operation. Data processor 11 will respectively provide an address pre-drive signal and a data pre-drive signal during consecutive system clock signals. In the multiplexed mode as shown graphically in FIG. 5, the output communication bus 15 initially transmits a single group of address bits and then transmits groups or bursts of data bits. In the illustrated form, four distinct bursts of data bits are illustrated. Assuming address control circuit 22 has received an address pre-drive signal from data processor 11, whenever clock signals TClk 4 and TClk 1 transition as indicated in FIG. 5, the address drive signal is asserted by going to a high logic level. The address drive signal is coupled to address bus driver 26. Due to intentional delay provided by the circuitry, the address bits are always delayed beginning transmission by one clock sub-beat from the apparent end of a transmission of data bits. The amount of delay is determined by the amount of time between the deactivation of the data drive signal and the activation of the address drive signal. When clock signal TClk4 transitions to a logic high value, the address drive output of address control circuit 22 transitions back to a logic low level thereby disabling address bus driver circuit 26. Due to delay caused by non-zero propagation delays inherent in the circuitry, address bits will not be disabled at the transition point of the address drive signal at the end of the address bit period. It should also be noted that delays associated with the circuitry will also cause some finite delay at the end of the data which is transmitted. However, address control circuit 22 and data control circuit 24 function to provide a clock sub-beat of delay between each address and data transmission at each possible boundary. This guaranteed delay which exists both after the address bits are outputted and before the data bits are outputted and after the data bits are outputted and before the address bits are outputted insures that no bit collisions can occur on the multiplexed communication bus external to data processor 11. After the data is output, data processor 11 stops asserting the data pre-drive signal which in turn causes the data drive signal to transition back to a logic low level. If more address and data information needs to be transferred, data processor 11 will repeat the multiplexed operation by providing an address pre-drive signal followed by a data pre-drive signal.

It should be noted that address control circuit 22 functions to turn off or disconnect the address bit stream early before data control circuit 24 functions to connect the data bit stream to the external multiplexed output bus. By controlling the internal timing of the address and data bits to be outputted by data processor 11, the present invention provides an easy user operable selection of multiplexed or non-multiplexed output bus operation. The present invention is also advantageous because an actual multiplexor circuit is not required to be used in a speed critical data or address path which might degrade system performance in the non-multiplexed mode as well as in the multiplexed mode.

In the normal or non-multiplexed mode of operation as programmed by a user external to data processor 11, data processor 11 provides an address pre-drive signal followed by a data pre-drive signal one system clock cycle later. After the address drive signal transitions to a high logic level address control circuit 22 provides the address drive signal, and enables address bus driver 26 to output address bits. One system clock cycle later, data processor 11 provides the data pre-drive signal to data control circuit 24 which causes data control circuit 24 to output the data drive signal to data bus driver 28. Data bus driver 28 provides data independently of the outputting of address bits by address bus driver 26.

By insuring that address bits are always turned off in the multiplexed mode before data bits are transmitted, control circuits 22 and 24 function to prevent clocked signal collisions both internal to data processor 11 and external to data processor 11 in system 10. The present invention increases the set-up time of memory 14 in system 10 by providing address and data bits, in multiplexed mode, very quickly from data processor 11 to memory 14. Therefore, an improvement in overall system speed and performance is realized as compared with previously known data processors using an external multiplexor.

Although the present invention has been described in the context of outputting or writing address bits and data bits to a destination external to a data processor integrated circuit, the present invention may also be used to receive or read address bits and data bits in a multiplexed/non-multiplexed operation. In order to have address and data bits written to data processor 11 by another processor, data processor 11 must be in a bus snoop or monitoring mode to be able to detect a bus transfer by the other processor. Also, when data processor 11 is in the multiplexed address and data bus mode and is receiving address and data bits to be read, data processor 11 must latch the received address bits since the address bits will not be present during an entire data read operation. Other circuitry, which is conventional but not shown in FIG. 2, is used to receive and latch inputted address and read data bits.

In the illustrated form, data processor 11 is easily controlled externally by coupling an externally supplied multiplexing mode control signal to data processor 11 which is used to generate an address control signal and a data control signal. It should be apparent that the externally supplied multiplexing mode control signal only needs to be coupled to data processor 11 for a brief period of time since the mode control signal can be latched internally by data processor 11. In an alternate form, the present invention may be implemented by using an internally executed instruction which is one of a plurality of instructions in an instruction set. When data processor 11 executes the predetermined instruction, data processor 11 is placed in a multiplexed mode the same as if multiplexor control circuit 20 received a multiplexed mode control signal from external to data processor 11. For example, execution of the special multiplex bus mode instruction may result in a predetermined bus mode status bit being set internally. Execution of the instruction by a conventional execution unit (not shown) of data processor 11 provides the multiplex mode control signal. The operation of data processor 11 to provide either multiplexed or non-multiplexed address and data output bits is then analogous to the previously described operation.

By now it should be apparent that a data processor which can be easily externally programmed to provide address and data bits in either a multiplexed or non-multiplexed communication bus form without requiring external circuitry has been provided. The objectives of the present invention have been accomplished by controlling the internal timing of data processor 11 to allow flexible multiplexed and non-multiplexed communication bus operation. Further, no internal multiplexing circuitry is required to implement a multiplexed address/data operational mode. The present invention reduces the number of signals which must be routed on a printed circuit board using data processors without sacrificing other performance criteria such as introducing time delays into critical speed paths. More importantly, the present invention greatly enhances the design possibilities associated with a single integrated circuit microprocessor.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor integrated circuit having first and second terminals for respectively being coupled to an address communication bus and a data communication bus, said first and second terminals of the data processor integrated circuit being externally controlled for either time division multiplexed or non-multiplexed operation, said data processor integrated circuit providing data and address timing control signals, said data processor integrated circuit having multiplex bus mode circuitry comprising:

control means having an input for receiving a bus mode signal, said bus mode signal being controlled from external to the data processor integrated circuit to place the data processor integrated circuit in either a multiplexed or non-multiplexed bus operation, said control means selectively providing a data drive signal at a first output and an address drive signal at a second output;

address bus drive means having an input coupled to the second output of the control means and an output coupled to the first terminal of the data processor integrated circuit for providing address bits at the first terminal of the data processor integrated circuit in response to the address drive signal; and data bus drive means having an input coupled to the first input of the control means and an output coupled to the second terminal of the data processor integrated circuit for providing data bits at the second terminal of the data processor integrated circuit in response to the data drive signal;

said data processor integrated circuit implementing time division multiplexed operation of address and data bits in response to the bus mode signal when the first and second terminals are directly connected and without requiring additional circuitry external to the data processor integrated circuit, said data processor integrated circuit not implementing time division multiplexing of data and address bits in response to the bus mode signal, the first and second terminals not being directly connected when time division multiplexing is not implemented.

2. The data processor integrated circuit of claim 1 wherein said control means provides both the data drive signal and the address drive signal in response to the bus mode signal and data and address output timing control signals generated by the data processor integrated circuit.

3. The data processor integrated circuit of claim 1 wherein the address bus drive means of the multiplex bus mode circuitry completely terminates outputting of address bits before outputting of data bits begins when the bus mode signal places the data processor in a multiplexed bus mode and the first and second terminals are connected for time division multiplexed operation.

4. The data processor integrated circuit of claim 1 wherein the data bus drive means of the multiplex bus mode circuitry completely terminates outputting of data bits before outputting of address bits begins when the bus mode signal places the data processor in a multiplexed bus mode and the first and second terminals are connected for time division multiplexed operation.

5. The data processor integrated circuit of claim 1 wherein said control means further comprise:

a first circuit portion having first and second inputs each of which is respectively connected to a predetermined circuit terminal of the data processor, and having an output for providing a bus multiplexor control signal, said bus multiplexor control signal being provided in response to first and second input signals each of which is respectively connected to a predetermined circuit terminal;

a second circuit portion having a first input connected to the output of the first circuit portion for receiving the bus multiplexor control signal, and having an output for providing the data drive signal; and a third circuit portion having a first input connected to the output of the first circuit portion for also receiving the bus multiplexor control signal, and having an output for providing the address drive signal.

6. A method of providing a data processor integrated circuit which permits a user of the data processor integrated circuit to convert between multiplexed and non-multiplexed communication bus operation modes of the data processor integrated circuit at external data and address terminals of the data processor integrated circuit, comprising the steps of:

monolithically integrating a data processor into a circuit having a plurality of input and output terminals;

providing the user of the data processor integrated circuit with an option of selectively coupling a data output bus terminal of the data processor integrated circuit directly to an address output bus terminal when the user desires time division multiplexed operation of addresses and data; and providing the user of the integrated circuit with an ability to control a data bus driver and an address bus driver contained within the data processor integrated circuit, the data bus driver having an input coupled to an output mode control signal and an output coupled to the data output bus terminal, the address bus driver having an input coupled to the output mode control signal and an output coupled to the address output bus terminal, the data bus driver and address bus driver respectively providing data and addresses in response to the output mode control signal to selectively provide time division multiplexed outputting of address bits and data bits, said output mode control signal being generated within the integrated circuit and controlled by the user of the data processor integrated circuit;

said data processor integrated circuit also being able to provide non-multiplexed address bits and data bits respectively at the address output bus terminal and the data output bus terminal in response to the output mode control signal, the data output bus terminal being uncoupled by the user of the integrated circuit from the address output bus terminal.

7. The method of claim 6 further comprising the step of:

providing the output mode control signal in response to the user of the integrated circuit coupling a communication bus mode control signal to a predetermined input terminal of the data processor integrated circuit.

8. The method of claim 6 further comprising the step of:

providing the output mode control signal in response to the user of the integrated circuit programming the data processor to execute a predetermined communication bus mode instruction, said data processor entering into either a multiplexed address and data bus mode or a non-multiplexed address and data bus mode in response to executing the instruction.

9. In a data processor integrated circuit with externally selectable time division multiplexed and non-multiplexed address and data communication bus terminals, a method of providing data and address bits in either a time division multiplexed format or in a non-multiplexed format, comprising the steps of:

monolithically integrating a data processor into a circuit having a plurality of input and output terminals;

receiving a bus mode signal at a predetermined one of the input terminals, the bus mode signal being provided from a source external to the data processor integrated circuit, said bus mode signal defining either a time division multiplexed format of address and data bits or a non-multiplexed format of address and data bits for the data processor integrated circuit;

providing control circuitry within the data processor integrated circuit to generate at least one control signal internal to the data processor integrated circuit in response to the bus mode signal, said control circuitry having an input for receiving the bus mode signal and an output for providing the at least one control signal, said at least one control signal controlling outputting of address and data bits by the data processor integrated circuit in either a time division multiplexed outputting or an outputting of address and data bits in time independent operation, said time division multiplexed outputting guaranteeing a predetermined delay period between outputting of address and data bits; and directly electrically connecting the address and data communication bus terminals of the integrated circuit when the data processor integrated circuit operates in the time division multiplexed format, wherein no additional circuitry external to the data processor integrated circuit is required in order to allow a user of the data processor integrated circuit to implement the time division multiplexed format of address and data bits.

* * * * *

UNITED STATES PATENT AND TRADEMARK OFFICE
CERTIFICATE OF CORRECTION

PATENT NO. : 5,086,407
DATED : February 4, 1992
INVENTOR(S) : Ralph McGarity, et. al.

It is certified that error appears in the above-indentified patent and that said Letters Patent is hereby corrected as shown below:

On the Title page, item [76] inventor: insert Kenneth C. Scheuer, 6503 Robbie Creek Cove, Austin, Texas 78750--.

Signed and Sealed this

Sixth Day of July, 1993

Attest:

MICHAEL K. KIRK

*Attesting Officer*   *Acting Commissioner of Patents and Trademarks*